(12) United States Patent
Takiguchi

(10) Patent No.: US 9,748,527 B2
(45) Date of Patent: Aug. 29, 2017

(54) ALUMINUM ALLOY SHEET MATERIAL FOR LITHIUM-ION BATTERY AND METHOD FOR PRODUCING THE SAME

(71) Applicant: UACJ CORPORATION, Chiyodu-ku, Tokyo (JP)

(72) Inventor: Koichiro Takiguchi, Tokyo (JP)

(73) Assignee: UACJ CORPORATION, Chiyoda-ku, Tokyo (JP)

(*) Notice: Subject to any disclaimer, the term of this patent is extended or adjusted under 35 U.S.C. 154(b) by 47 days.

(21) Appl. No.: 14/387,453

(22) PCT Filed: Mar. 11, 2013

(86) PCT No.: PCT/JP2013/056638
§ 371 (c)(1),
(2) Date: Sep. 23, 2014

(87) PCT Pub. No.: WO2013/141060
PCT Pub. Date: Sep. 26, 2013

(65) Prior Publication Data
US 2015/0086855 A1    Mar. 26, 2015

(30) Foreign Application Priority Data

Mar. 23, 2012  (JP) ................................. 2012-067416

(51) Int. Cl.
*H01M 2/02* (2006.01)
*C22C 21/00* (2006.01)
(Continued)

(52) U.S. Cl.
CPC ........... *H01M 2/0262* (2013.01); *C22C 21/00* (2013.01); *C22F 1/00* (2013.01); *C22F 1/04* (2013.01);
(Continued)

(58) Field of Classification Search
CPC ...... H01M 2/02; H01M 2/0262; H01M 2/026; C22C 21/00; C22F 1/04
See application file for complete search history.

(56) References Cited

U.S. PATENT DOCUMENTS

2003/0059336 A1* 3/2003 Aida .................... B21C 23/005
420/535

FOREIGN PATENT DOCUMENTS

| JP | 2000-017364 A | 1/2000 |
| JP | 2000-239775 A | 9/2000 |

(Continued)

OTHER PUBLICATIONS

Office Action of Chinese Patent Office issued in Application No. 2013800156808 with English translation dated Dec. 29, 2015 (6 pages).

(Continued)

*Primary Examiner* — Karie O'Neill Apicella
(74) *Attorney, Agent, or Firm* — Flynn, Thiel, Boutell & Tanis, P.C.

(57) ABSTRACT

An aluminum alloy sheet material for a lithium-ion battery can significantly reduce the number of welding defects (e.g., bead non-uniformity and underfill) that occur during laser welding. The aluminum alloy sheet material includes 0.8 to 1.5 mass % of Mn, 0.6 mass % or less of Si, 0.7 mass % or less of Fe, 0.2 mass % or less of Cu, and 0.2 mass % or less of Zn, with the balance being Al and unavoidable impurities, Al—Mn—Si-based intermetallic compounds having a maximum length of less than 1.0 μm being distributed in a matrix of the aluminum alloy sheet material in a number equal to or larger than 0.25 per μm$^2$, and the area ratio of the intermetallic compounds being 3.0% or more when a field of view having an area of 5000 μm$^2$ is subjected to image analysis.

4 Claims, 1 Drawing Sheet

(51) Int. Cl.
*C22F 1/04* (2006.01)
*C22F 1/00* (2006.01)
*H01M 10/0525* (2010.01)

(52) U.S. Cl.
CPC ....... *H01M 2/029* (2013.01); *H01M 10/0525* (2013.01); *H01M 2002/0297* (2013.01); *H01M 2220/20* (2013.01); *Y02E 60/122* (2013.01); *Y02P 70/54* (2015.11); *Y02T 10/7011* (2013.01)

(56) References Cited

FOREIGN PATENT DOCUMENTS

| JP | 2000239775 A | * | 9/2000 | ............. H01M 2/02 |
|----|----|----|----|----|
| JP | 2006-037129 A | | 2/2006 | |
| JP | 2006037129 A | * | 2/2006 | ............. C22C 21/00 |
| JP | 2009-019223 A | | 1/2009 | |
| JP | 2009-127075 A | | 6/2009 | |
| JP | 2009-287116 A | | 12/2009 | |

OTHER PUBLICATIONS

Tao Xu et al., Research and Manufacture of 3003H14 Aluminum Alloy Strip for Mobile Phone Battery Shell, with English translation, Mechanical Engineers 5$^{th}$, 2007 (18 pages).
International Search Report for PCT/JP2013/056638 (2 pgs.).

* cited by examiner

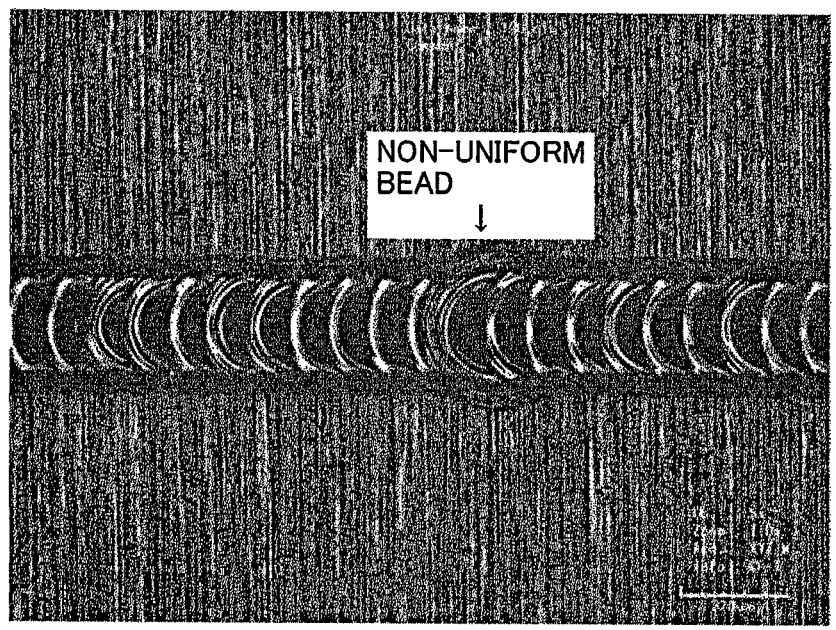

ALUMINUM ALLOY SHEET MATERIAL FOR LITHIUM-ION BATTERY AND METHOD FOR PRODUCING THE SAME

TECHNICAL FIELD

The invention mainly relates to an aluminum alloy sheet material that is suitable as a casing material and a sealing material for an on-board lithium-ion battery. In particular, the invention relates to an aluminum alloy sheet material that can suppress occurrence of welding defects when laser-welding the casing material and the sealing material, and a method for producing the same.

BACKGROUND ART

A lithium-ion battery has attracted attention as a battery used for hybrid vehicles and electric vehicles. The lithium-ion battery is produced by enclosing an internal structure (e.g., electrode) in a cylindrical or rectangular container (casing material), laser-welding a sealing lid (sealing material), and injecting an electrolyte solution into the container. An aluminum alloy that has a reduced weight, and allows integral press forming and laser welding has been used for forming the casing material and the sealing material.

When welding beads have locally become large and deep (i.e., when bead non-uniformity has occurred) when laser-welding the casing material and the sealing material, porosity may occur, or the internal structure may be thermally affected, or the beads may be locally removed to form a recess (i.e., the thickness of the sealed part decreases), whereby safety may be impaired, for example.

A JIS A1050 aluminum alloy has been employed as an aluminum alloy that exhibits excellent press formability and laser weldability. It has been proposed to limit the Ti content in a JIS A1050 aluminum alloy to 0.01% or less, or limit the viscosity in a liquid phase to 0.016 Pa·s by adjusting the Ti content and the B content in order to reduce the number of welding defects during laser welding.

An increase in strength and a reduction in thickness have been desired for an aluminum alloy sheet material for a lithium-ion battery in order to reduce the size and the weight of the lithium-ion battery, and use of a JIS A3003 aluminum alloy instead of a JIS A1050 aluminum alloy has been desired. However, since the JIS A3003 aluminum alloy has a high component content and includes a large amount of intermetallic compounds as compared with the JIS A1050 aluminum alloy, welding defects easily occur. Therefore, prompt measures to remedy this problem have been desired.

RELATED-ART DOCUMENT

Patent Document

Patent Document 1: JP-A-2009-127075
Patent Document 2: JP-A-2009-287116

SUMMARY OF THE INVENTION

Technical Problem

A laser such as a YAG laser (wavelength: 1.06 μm) or a fiber laser (wavelength: 1.07 μm) has been used when laser-welding the casing material and the sealing material of an on-board lithium-ion battery. The inventors of the invention focused on the fact that Al—Fe-based intermetallic compounds, Al—Fe—Si-based intermetallic compounds, Al—Mn-based intermetallic compounds, and Al—Mn—Si-based intermetallic compounds included in a JIS A3003 aluminum alloy have a laser light absorption rate higher than that of the aluminum matrix, and conducted tests and studies. As a result, the inventors found that, when the above intermetallic compounds are finely dispersed in the aluminum matrix so that the applied laser light is uniformly absorbed, the number of welding defects that occur during laser welding can be reduced, and heat is easily released (i.e., the number of welding defects can be reduced) even when the electrical conductivity of the matrix is high, or even when a rapid heat input that causes welding defects has occurred (e.g., when laser light has been applied to coarse intermetallic compounds) during laser welding.

The invention was conceived based on the above findings. An object of the present invention is to provide an aluminum alloy sheet material for a lithium-ion battery that can significantly reduce the number of welding defects (e.g., bead non-uniformity and recesses (underfill)) that occur during laser welding (e.g., pulsed laser welding or continuous-wave (CW) laser welding), and a method for producing the same.

Solution to Problem

According to a first aspect of the invention, an aluminum alloy sheet material for a lithium-ion battery (hereinafter may be referred to as "aluminum alloy sheet material") includes 0.8 to 1.5 mass % of Mn, 0.6 mass % or less of Si, 0.7 mass % or less of Fe, 0.2 mass % or less of Cu, and 0.2 mass % or less of Zn, with the balance being Al and unavoidable impurities, Al—Mn—Si-based intermetallic compounds having a maximum length of less than 1.0 μm being distributed in a matrix of the aluminum alloy sheet material in a number equal to or larger than 0.25 per μm$^2$, and the area ratio of the intermetallic compounds being 3.0% or more when a field of view having an area of 5000 μm$^2$ is subjected to image analysis.

The aluminum alloy sheet material according to the first aspect of the invention may have an electrical conductivity at 25° C. of 45 to 55 IACS %.

The aluminum alloy sheet material according to the first aspect of the invention may have an average surface crystal grain size (circle equivalent diameter) of 50 μm or less.

According to a second aspect of the invention, a method for producing an aluminum alloy sheet material for a lithium-ion battery includes homogenizing an ingot of an aluminum alloy having the composition according to the first aspect of the invention at 400 to 550° C. for 3 to 48 hours, hot-rolling the homogenized ingot at a hot-rolling start temperature of 400 to 550° C., cold-rolling the hot-rolled ingot at a reduction ratio of 70% or more to have a specific thickness, and subjecting the cold-rolled ingot to final annealing in a continuous annealing furnace at a temperature increase rate of 100 to 500° C./s and an annealing temperature of 480 to 550° C.

Advantageous Effects of the Invention

The aspects of the invention thus provide an aluminum alloy sheet material for a lithium-ion battery that can significantly reduce the number of welding defects (e.g., bead non-uniformity and recesses) that occur during laser welding, and may suitably be used as the casing material and the sealing material for a lithium-ion battery, and a method for producing the same.

BRIEF DESCRIPTION OF DRAWINGS

FIG. 1 is a view illustrating an example of bead non-uniformity that occurs during pulsed laser welding.

DESCRIPTION OF EMBODIMENTS

The effects of each alloy component of the aluminum alloy sheet material for a lithium-ion battery according to the invention, and the reasons for which the content range of each alloy component is limited as described above, are described below.

Mn

Mn is an element that is effective for improving the strength of the aluminum alloy sheet material. The Mn content is preferably 0.8 to 1.5 mass %. If the Mn content is less than 0.8 mass %, the effect of improving the strength of the aluminum alloy sheet material may be insufficient. If the Mn content exceeds 1.5 mass %, coarse intermetallic compounds may be produced during casting, and breakage may occur when forming a casing material, or the formability of the explosion-proof valve may deteriorate when forming a sealing material. Mn is dissolved in the aluminum matrix to lower the electrical conductivity, and improves the thermal conversion efficiency of the applied laser light. Moreover, Mn produces Al—Mn-based intermetallic compounds and Al—Mn—Si-based intermetallic compounds, and improves the laser light absorption rate.

Si

Si produces Al—Mn—Si-based intermetallic compounds when homogenizing the ingot, and improves the dispersibility of the intermetallic compounds. If the Si content exceeds 0.6 mass %, coarse Al—Fe—Si-based intermetallic compounds or Al—Mn—Si-based intermetallic compounds may be easily produced, and welding defects may occur from these intermetallic compounds during laser welding. Therefore, the Si content is preferably limited to 0.6 mass % or less, more preferably 0.35 mass % or less, and still preferably 0.05 mass % or less. However, since it is necessary to use high-purity ground metal when reducing the Si content, the production cost may increase. Moreover, since an increase in electrical conductivity may occur due to a decrease in dissolved Si content, the thermal conversion efficiency of the applied laser light may decrease, and the penetration depth may decrease. Therefore, it is desirable to select an optimum Si content taking account of cost and the desired penetration depth.

Fe

Fe produces Al—Fe-based intermetallic compounds and Al—Fe—Si-based intermetallic compounds when homogenizing the ingot, and improves the dispersibility of the intermetallic compounds. If the Fe content exceeds 0.7 mass %, coarse Al—Fe-based intermetallic compounds may be produced to a large extent, and breakage may occur when forming a casing material, or the formability of the explosion-proof valve may deteriorate when forming a sealing material. Therefore, it is preferable to limit the Fe content to 0.7 mass % or less.

Cu

Cu is added to adjust the potential of the surface of the material. If the Cu content exceeds 0.2 mass %, local corrosion may easily occur from Al—Cu-based intermetallic compounds (precipitates). Therefore, it is preferable to limit the Cu content to 0.2 mass % or less.

Zn

The Zn content is preferably 0.2 mass % or less. If the Zn content exceeds 0.2 mass %, the potential of the surface of the material may decrease, and uniform corrosion may easily occur.

The advantageous effects of the invention are not impaired even if the aluminum alloy sheet material further includes 0.05 mass % or less of Cr, 0.05 mass % or less of Mg, and/or 0.05 mass % or less of Ti.

The method for producing an aluminum alloy sheet material for a lithium-ion battery according to the invention is described below.

An aluminum alloy having the above composition is melted, and cast. The aluminum alloy may be cast using a normal semi-continuous casting method. In order to reduce production of coarse crystallized products (intermetallic compounds) (that absorb the applied laser light to produce welding defects) during casting, it is desirable to increase the casting speed, or reduce the thickness of the ingot (slab), for example.

The resulting ingot is homogenized. The ingot is homogenized at 400 to 550° C. for 3 to 48 hours so that Al—(Mn, Fe)—Si-based intermetallic compounds (hereinafter referred to as "Al—Mn—Si-based intermetallic compounds") finely precipitate. If the homogenization temperature is less than 400° C., Al—Mn—Si-based intermetallic compounds may not sufficiently finely precipitate. If the homogenization temperature exceeds 550° C., Al—Mn—Si-based intermetallic compounds may aggregate to form coarse particles, and Mn may be dissolved again. In either case, the advantageous effects of the invention may not be obtained. If the homogenization time is less than 3 hours, Al—Mn—Si-based intermetallic compounds may not sufficiently finely precipitate. If the homogenization time exceeds 48 hours, the homogenization cost may be too high with respect to the precipitation effect.

The homogenized ingot is hot-rolled. The hot-rolling start temperature is set to 400 to 550° C. in order to promote precipitation of Al—Mn—Si-based intermetallic compounds during hot rolling. The hot-rolled ingot is cold-rolled to have a specific thickness. The reduction ratio during cold rolling is preferably set to 70% or more in order to utilize strain introduced during cold rolling as an Al—Mn—Si-based intermetallic compound precipitation site.

Final annealing is performed using a continuous annealing furnace. Since recrystallization does not easily proceed due to the effects of fine precipitation of Al—Mn—Si-based intermetallic compounds, final annealing is performed at a temperature increase rate of 100 to 500° C./s and an annealing temperature of 480 to 560° C. If the annealing temperature is less than 480° C., recrystallization may not sufficiently occur, and cracks or orange peel surfaces may easily occur during drawing/ironing forming or press forming. If the annealing temperature exceeds 560° C., Mn may be dissolved again, and coarse recrystallized grains may be produced.

In order to improve the laser light absorption rate to reduce the number of welding defects, it is important to cause a specific amount of Mn-containing intermetallic compounds (Al—Mn—Si-based intermetallic compounds) to precipitate in the matrix. In an aluminum alloy sheet material produced by the above production method, Al—Mn—Si-based intermetallic compounds having a maximum length of less than 1.0 µm are distributed in the matrix in a number equal to or larger than 0.25 per µm$^2$, and the area ratio of the intermetallic compounds is 3.0% or more when a field of view having an area of 5000 µm$^2$ is subjected to image analysis. The aluminum alloy sheet material has an electrical conductivity at 25° C. of 45 to 55 IACS %, and has an average surface crystal grain size (circle equivalent diameter) of 50 μm or less. The advantageous effects of the invention can be achieved by satisfying these properties.

When Al—Mn—Si-based intermetallic compounds having a maximum length of less than 1.0 μm are distributed in the matrix in a number equal to or larger than 0.25 per μm$^2$, laser light is uniformly absorbed during laser welding, and welding defects are suppressed. When the area ratio of the intermetallic compounds is 3.0% or more when a field of view having an area of 5000 μm$^2$ is subjected to image analysis, laser light is more uniformly absorbed, and laser welding can be performed without producing welding defects.

EXAMPLES

The invention is further described below by way of examples and comparative examples to demonstrate the advantageous effects of the invention. Note that the following examples are intended for illustration purposes only, and the invention is not limited to the following examples.

Example 1

Each of aluminum alloys A to G having the composition shown in Table 1 was melted, and cast using a normal semi-continuous casting method. The resulting ingot (thickness: 500 mm) was homogenized at 500° C. for 12 hours, and each rolling target surface was machined to a depth of 8 mm. The ingot was then hot-rolled (hot rolling start temperature: 500° C., hot rolling finish temperature: 270° C.) to obtain a hot-rolled sheet having a thickness of 5.0 mm. The hot-rolled sheet was cold-rolled to a thickness of 1.0 mm, heated to 500° C. at a temperature increase rate of 200° C./s, and held at 500° C. for 120 seconds to obtain a specimen (Specimens 1 to 7).

Comparative Example 1

Each of aluminum alloys H to M having the composition shown in Table 1 was melted, and cast using a normal semi-continuous casting method. The resulting ingot was treated in the same manner as in Example 1 to obtain a specimen (Specimens 8 to 13).

Example 2

The ingot (thickness: 500 mm) of the aluminum alloy F that was cast in Example 1 was homogenized under the conditions shown in Table 2, and each rolling target surface was machined to a depth of 8 mm. The ingot was subjected to hot rolling, cold rolling, and final annealing under the conditions shown in Table 2 to obtain a specimen (Specimens 14 to 28).

Comparative Example 2

The ingot (thickness: 500 mm) of the aluminum alloy F that was cast in Example 1 was homogenized under the conditions shown in Table 2, and each rolling target surface was machined to a depth of 8 mm. The ingot was subjected to hot rolling, cold rolling, and final annealing under the conditions shown in Table 2 to obtain a specimen (Specimens 29 to 36).

Specimens 1 to 7 and 14 to 28 produced in Examples 1 and 2 and Specimens 8 to 13 and 29 to 36 produced in Comparative Examples 1 and 2 were subjected to intermetallic compound (Al—Mn—Si-based intermetallic compound) image analysis, electrical conductivity measurement, crystal grain size measurement, and laser welding stability evaluation using the following methods. The results are shown in Tables 3 and 4. In Tables 1 to 4, the values that fall outside the scope of the invention are underlined.

Image analysis: The number and the average maximum length of intermetallic compounds captured within an optical micrograph (magnification: 1000, three fields of view, 5000 μm$^2$) were measured using an image analyzer "LUZEX-AP" (manufactured by NIRECO Corporation) (after intermetallic compounds having a maximum length of 1.0 μm or more were excluded).

Electrical conductivity: The electrical conductivity (at 25° C.) of the specimen was measured at five points using a tester "Sigmatest 2.069" (manufactured by Foerster Japan Limited), and the average value of the values measured at three points excluding the maximum value and the minimum value was taken as the measured value.

Crystal grain size: The average crystal grain size of the surface of the specimen was calculated from an optical micrograph (magnification: 100, three fields of view) using the ASTM comparative method.

Laser welding stability (number of bead non-uniformities): Laser welding (length: 500 mm) was performed using a laser "YLR-2000" (ytterbium fiber laser) (manufactured by iPG) (fiber diameter: 0.1 mm, frequency: 120 Hz, peak output: 1.6 kW, welding speed: 15 mm/s, shielding gas: Ar (0.25 L/s)). The laser welding stability was evaluated by measuring the number of bead non-uniformities in which the bead size locally increased (see FIG. 1). A case where the number of bead non-uniformities was less than 0.10 per mm was evaluated as "Acceptable".

TABLE 1

| Alloy | Chemical component (mass %) | | | | |
|---|---|---|---|---|---|
| | Mn | Si | Fe | Cu | Zn |
| A | 0.86 | 0.22 | 0.41 | 0.15 | 0.03 |
| B | 1.4 | 0.23 | 0.52 | 0.16 | 0.02 |
| C | 1.1 | 0.03 | 0.44 | 0.15 | 0.01 |
| D | 1.1 | 0.57 | 0.43 | 0.13 | 0.01 |
| E | 1.2 | 0.21 | 0.66 | 0.15 | 0.02 |
| F | 1.2 | 0.23 | 0.58 | 0.18 | 0.02 |
| G | 1.1 | 0.25 | 0.40 | 0.12 | 0.17 |
| H | 0.71 | 0.30 | 0.42 | 0.13 | 0.02 |
| I | 1.6 | 0.23 | 0.51 | 0.11 | 0.03 |
| J | 1.2 | 0.70 | 0.43 | 0.15 | 0.02 |
| K | 1.1 | 0.20 | 0.74 | 0.12 | 0.02 |
| L | 1.2 | 0.26 | 0.57 | 0.25 | 0.03 |
| M | 1.2 | 0.23 | 0.52 | 0.16 | 0.27 |

TABLE 2

| Specimen | Alloy | Homogenization treatment Temperature (° C.) | Homogenization treatment Time (h) | Hot rolling Start temperature (° C.) | Hot rolling Final thickness (mm) | Cold rolling Final thickness (mm) | Cold rolling Reduction ratio (%) | Final annealing Temperature increase rate (° C./s) | Final annealing Temperature (° C.) | Final annealing Holding time (s) |
|---|---|---|---|---|---|---|---|---|---|---|
| 14 | F | 420 | 12 | 500 | 5.0 | 1.0 | 90 | 200 | 500 | 120 |
| 15 | F | 540 | 12 | 500 | 5.0 | 1.0 | 90 | 200 | 500 | 120 |
| 16 | F | 500 | 3 | 500 | 5.0 | 1.0 | 90 | 200 | 500 | 120 |
| 17 | F | 500 | 48 | 500 | 5.0 | 1.0 | 90 | 200 | 500 | 120 |
| 18 | F | 500 | 12 | 410 | 5.0 | 1.0 | 90 | 200 | 500 | 120 |
| 19 | F | 500 | 12 | 540 | 5.0 | 1.0 | 90 | 200 | 500 | 120 |
| 20 | F | 500 | 12 | 500 | 5.0 | 1.5 | 70 | 200 | 500 | 120 |
| 21 | F | 500 | 12 | 500 | 5.0 | 1.0 | 90 | 100 | 500 | 120 |
| 22 | F | 500 | 12 | 500 | 5.0 | 1.0 | 90 | 200 | 480 | 120 |
| 23 | F | 500 | 12 | 500 | 5.0 | 1.0 | 90 | 200 | 540 | 120 |
| 24 | F | 500 | 12 | 500 | 5.0 | 1.0 | 90 | 200 | 500 | 60 |
| 25 | F | 500 | 12 | 500 | 5.0 | 1.0 | 90 | 200 | 500 | 180 |
| 26 | F | 500 | 12 | 500 | 5.0 | 1.0 | 90 | 200 | 500 | 0 |
| 27 | F | 500 | 12 | 500 | 5.0 | 1.0 | 90 | 200 | 500 | 5 |
| 28 | F | 500 | 12 | 500 | 5.0 | 1.0 | 90 | 200 | 500 | 15 |
| 29 | F | 390 | 12 | 500 | 5.0 | 1.0 | 90 | 200 | 500 | 120 |
| 30 | F | 500 | 1 | 500 | 5.0 | 1.0 | 90 | 200 | 500 | 120 |
| 31 | F | 600 | 6 | 580 | 5.0 | 1.0 | 90 | 200 | 500 | 120 |
| 32 | F | 500 | 12 | 380 | 5.0 | 1.0 | 90 | 200 | 500 | 120 |
| 33 | F | 500 | 12 | 500 | 5.0 | 2.0 | 60 | 200 | 500 | 120 |
| 34 | F | 500 | 12 | 500 | 5.0 | 1.0 | 90 | 75 | 500 | 120 |
| 35 | F | 500 | 12 | 500 | 5.0 | 1.0 | 90 | 200 | 450 | 120 |
| 36 | F | 500 | 12 | 500 | 5.0 | 1.0 | 90 | 200 | 560 | 120 |

TABLE 3

| Specimen | Alloy | Number of Al—Mn—Si-based intermetallic compounds having maximum length of less than 1.0 μm (per μm$^2$) | Area ratio of Al—Mn—Si-based intermetallic compounds having maximum length of less than 1.0 μm (%) | Crystal grain size (μm) | Electrical conductivity at 25° C. (IACS %) | Number of bead non-uniformities (per mm) |
|---|---|---|---|---|---|---|
| 1 | A | 0.28 | 3.2 | 50 | 53 | 0.05 |
| 2 | B | 0.62 | 4.2 | 40 | 46 | 0.08 |
| 3 | C | 0.36 | 3.0 | 50 | 45 | 0.04 |
| 4 | D | 0.65 | 4.8 | 40 | 49 | 0.08 |
| 5 | E | 0.56 | 4.6 | 40 | 46 | 0.07 |
| 6 | F | 0.47 | 3.8 | 45 | 47 | 0.04 |
| 7 | G | 0.45 | 3.7 | 45 | 47 | 0.05 |
| 8 | H | 0.23 | 2.8 | 55 | 56 | 0.13 |
| 9 | I | 0.66 | 4.5 | 40 | 43 | 0.38 |
| 10 | J | 0.69 | 5.0 | 40 | 50 | 0.09[1] |
| 11 | K | 0.60 | 4.9 | 40 | 46 | 0.17 |
| 12 | L | 0.45 | 3.6 | 45 | 48 | 0.05[2] |
| 13 | M | 0.42 | 3.4 | 45 | 47 | 0.06[3] |

[1] Breakage occurred.
[2] Local corrosion occurred.
[3] Uniform corrosion occurred.

TABLE 4

| Specimen | Alloy | Number of Al—Mn—Si-based intermetallic compounds having maximum length of less than 1.0 μm (per μm$^2$) | Area ratio of Al—Mn—Si-based intermetallic compounds having maximum length of less than 1.0 μm (%) | Crystal grain size (μm) | Electrical conductivity at 25° C. (IACS %) | Number of bead non-uniformities (per mm) |
|---|---|---|---|---|---|---|
| 14 | F | 0.68 | 5.2 | 50 | 51 | 0.03 |
| 15 | F | 0.26 | 3.1 | 40 | 45 | 0.09 |
| 16 | F | 0.38 | 3.3 | 50 | 46 | 0.07 |
| 17 | F | 0.55 | 4.7 | 45 | 49 | 0.04 |
| 18 | F | 0.53 | 4.6 | 50 | 50 | 0.04 |
| 19 | F | 0.40 | 3.4 | 40 | 46 | 0.08 |
| 20 | F | 0.45 | 3.6 | 50 | 47 | 0.07 |
| 21 | F | 0.45 | 3.8 | 50 | 46 | 0.05 |
| 22 | F | 0.48 | 4.0 | 45 | 49 | 0.04 |

TABLE 4-continued

| Specimen | Alloy | Number of Al—Mn—Si-based intermetallic compounds having maximum length of less than 1.0 μm (per μm$^2$) | Area ratio of Al—Mn—Si-based intermetallic compounds having maximum length of less than 1.0 μm (%) | Crystal grain size (μm) | Electrical conductivity at 25° C. (IACS %) | Number of bead non-uniformities (per mm) |
|---|---|---|---|---|---|---|
| 23 | F | 0.44 | 3.5 | 50 | 46 | 0.07 |
| 24 | F | 0.46 | 3.7 | 45 | 47 | 0.05 |
| 25 | F | 0.45 | 3.7 | 50 | 46 | 0.06 |
| 26 | F | 0.48 | 3.8 | 40 | 48 | 0.04 |
| 27 | F | 0.48 | 3.8 | 45 | 47 | 0.04 |
| 28 | F | 0.46 | 3.7 | 45 | 47 | 0.05 |
| 29 | F | _0.21_ | _2.2_ | 50 | _44_ | 0.23 |
| 30 | F | _0.23_ | _2.5_ | _55_ | 45 | 0.18 |
| 31 | F | _0.22_ | _2.4_ | 40 | _43_ | 0.73 |
| 32 | F | _0.23_ | _2.3_ | _60_ | 48 | 0.17 |
| 33 | F | _0.24_ | _2.5_ | _55_ | 46 | 0.12 |
| 34 | F | 0.48 | 4.0 | _60_ | 49 | 0.06 |
| 35 | F | 0.49 | 4.1 | Recrystallization did not occur | 49 | 0.04 |
| 36 | F | 0.43 | 3.6 | _60_ | _44_ | 0.38 |

As shown in Tables 3 and 4, Specimens 1 to 7 and 14 to 28 that fall under the scope of the invention exhibited excellent laser welding stability (i.e., the number of bead non-uniformities was 0.09 or less per mm).

As shown in Table 3, Specimens 8 to 13 having an alloy composition that falls outside the scope of the invention were not suitable as an aluminum alloy sheet material for a lithium-ion battery from the viewpoint of formability, laser welding stability, corrosion resistance, and the like.

As shown in Table 4, Specimen 29 showed insufficient precipitation of Al—Mn—Si-based intermetallic compounds due to a low homogenization temperature, and exhibited poor laser welding stability. Specimen 30 showed insufficient precipitation of Al—Mn—Si-based intermetallic compounds due to a short homogenization time. Specimen 31 showed insufficient precipitation of Al—Mn—Si-based intermetallic compounds due to a high homogenization temperature and a high hot rolling start temperature. Specimen 33 had a small number of Al—Mn—Si-based intermetallic compound precipitation sites due to a small reduction ratio during cold rolling, and exhibited poor laser welding stability. Specimen 32 showed insufficient precipitation of Al—Mn—Si-based intermetallic compounds due to a high hot rolling start temperature, and exhibited poor laser welding stability.

Specimens 34 to 36 showed insufficient recrystallization, and exhibited poor formability due to a low temperature increase rate during final annealing, a low final annealing temperature, and a high final annealing temperature, respectively.

The invention claimed is:

1. An aluminum alloy sheet material for a lithium-ion battery comprising 0.8 to 1.5 mass % of Mn, 0.6 mass % or less of Si, 0.7 mass % or less of Fe, 0.2 mass % or less of Cu, and 0.2 mass % or less of Zn, with the balance being Al and unavoidable impurities, Al—Mn—Si-based intermetallic compounds having a maximum length of less than 1.0 μm being distributed in a matrix of the aluminum alloy sheet material in a number equal to or larger than 0.25 per μm$^2$, and an area ratio of the intermetallic compounds being 3.0% or more when a field of view having an area of 5000 μm$^2$ is subjected to image analysis.

2. The aluminum alloy sheet material according to claim 1, the aluminum alloy sheet material having an electrical conductivity at 25° C. of 45 to 55 IACS %.

3. The aluminum alloy sheet material according to claim 1, the aluminum alloy sheet material having an average surface crystal grain size (circle equivalent diameter) of 50 μm or less.

4. A method for producing an aluminum alloy sheet material for a lithium-ion battery comprising homogenizing an ingot of an aluminum alloy having the composition according to claim 1 at 400 to 550° C. for 3 to 48 hours, hot-rolling the homogenized ingot at a hot-rolling start temperature of 400 to 550° C., cold-rolling the hot-rolled ingot at a reduction ratio of 70% or more to have a specific thickness, and subjecting the cold-rolled ingot to final annealing in a continuous annealing furnace at a temperature increase rate of 100 to 500° C./s and an annealing temperature of 480 to 550° C.

* * * * *